Nov. 13, 1962  P. W. G. JOHNSTON ETAL  3,063,391
MANUFACTURE OF HARD CANDY
Filed Sept. 13, 1960  3 Sheets-Sheet 1
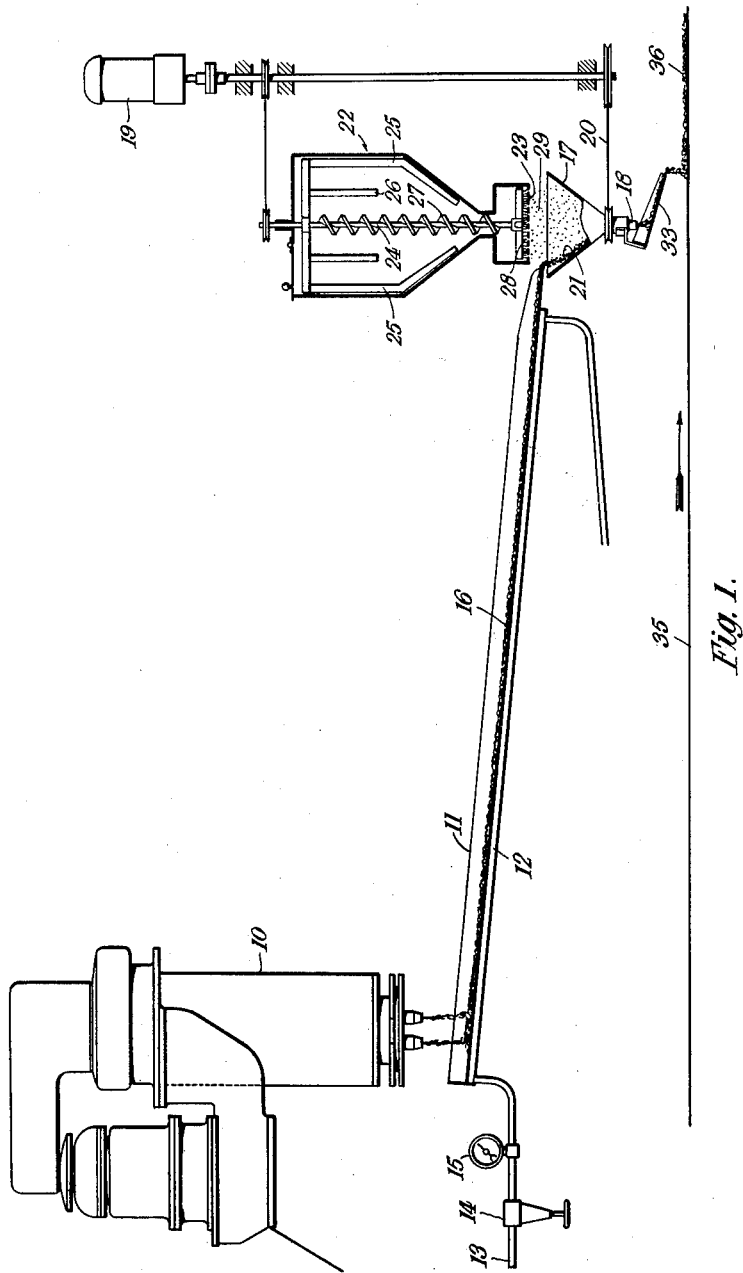
INVENTORS
Peter William Gilbey Johnston
Ronald George Hewitt
BY Watson, Cole, Grindle & Watson
ATTORNEYS Nov. 13, 1962  P. W. G. JOHNSTON ETAL  3,063,391
MANUFACTURE OF HARD CANDY
Filed Sept. 13, 1960  3 Sheets-Sheet 2
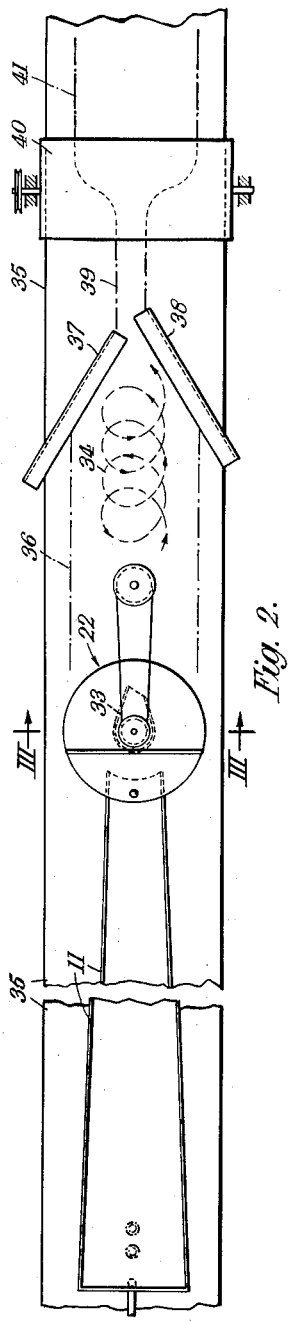
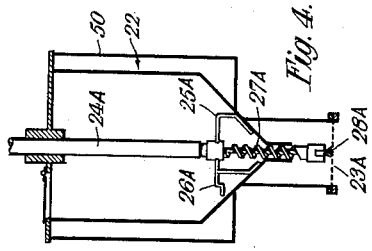
INVENTORS
Peter William Gilbey Johnston
Ronald George Hewitt
BY Watson, Cole, Grindle & Watson
ATTORNEYS Nov. 13, 1962    P. W. G. JOHNSTON ETAL    3,063,391
MANUFACTURE OF HARD CANDY
Filed Sept. 13, 1960    3 Sheets-Sheet 3

INVENTORS
Peter William Kilbey Johnston
Ronald George Hewitt
by Watson, Cole, Grindle & Watson
ATTORNEYS

United States Patent Office 3,063,391
Patented Nov. 13, 1962

3,063,391
MANUFACTURE OF HARD CANDY
Peter William Gilbey Johnston, Jesmond, Newcastle-on-Tyne, and Ronald George Hewitt, Peterborough, Northants, England, assignors to Baker Perkins Limited, Peterborough, England, a British company
Filed Sept. 13, 1960, Ser. No. 55,782
Claims priority, application Great Britain Sept. 28, 1959
8 Claims. (Cl. 107—4)

In the manufacture of high boiled sugar confectionery, the ingredients, normally granulated sugar, glucose and water, are heated in a steam heated vessel to dissolve the sugar and are then transferred to a cooker and boiled to remove all or nearly all of the water. Various types of cookers are available, including open pan cookers, batch vacuum cookers, continuous vacuum cookers and Microfilm cookers. "Microfilm" is a registered trademark.

After the sugar has been cooked, it is customary to introduce into the sugar a flavouring, an acid, e.g. tartaric, citric or lactic acid to enhance the flavour and frequently a colouring agent. The sugar is then introduced into a forming device, such for example as the batch former described in British Patent No. 784,157, which forms the sugar into a rope, a centre filling of jam, chocolate or the like being introduced, if desired, into the rope during formation thereof, and finally the rope of sugar is moulded by a moulding machine into confectionery tablets.

The additives (i.e. the flavouring, the acid and the colouring agent if required) have hitherto been introduced into the sugar by allowing a batch of cooked syrup to flow on to a table (at atmospheric temperature or slightly warmed) to form a layer perhaps ½" thick, scattering the additives on to the syrup and then folding the sugar over manually many times. This folding serves not only to disperse the additives uniformly throughout the mass of the sugar but also to prevent the skin of the sugar film from becoming preferentially chilled, the folds being made with the chilled surfaces of the sugar inside. After repeated folding, the sugar mass is in a condition suitable for transfer to the batch former.

The object of the invention is to eliminate manual folding of the sugar and to provide for continuous and automatic incorporation of additives therein.

The invention provides apparatus for manufacturing confectionery comprising an upright downwardly tapering funnel, means for feeding a ribbon of hot cooked sugar into the upper end of the funnel, mechanism for rotating the funnel continuously and means for discharging additives into the funnel and on to the sugar on the inner surface thereof preparatory to emergence of the sugar from the lower end of the funnel.

The sugar emerging from the lower end of the funnel may be discharged on to a conveyor band, and the additives preferably consist of a powdered acid and a liquid flavouring.

The sugar will normally be introduced into the funnel at a temperature of about 270° F. and it will therefore normally require some degree of cooling on its way from the cooker to the funnel. It may be supplied from a continuously dispensing reservoir fed from a batch cooker, but we prefer to supply the sugar continuously to the funnel from a Microfilm cooker. This may be effected by a suitable chute.

The powder feed should be substantially uniformly distributed over the whole area of the upper end of the funnel and is conveniently provided through a sieve by means of an agitating brush disposed above the sieve. The flavouring (which may contain a colouring agent) is preferably squirted into the funnel by a metering pump. If lactic acid is to be used as the acidifying agent, instead of a solid acid such as citric or tartaric acid, the powder feed is dispensed with and the lactic acid is squirted in with the flavouring.

As the ribbon of sugar travels down the inner surface of the funnel it receives a uniform coating of powder and the additives and sugar are effectively mixed in the funnel and during discharge of the sugar from the spout of the funnel. In order to ensure further mixing we prefer to provide a downwardly sloping tray, fixed to and rotating with the funnel, for receiving the discharge from the spout and delivering the sugar to the conveyor band. This causes further mixing in two stages, viz.:

(I) The discharge of the sugar on to the tray creates a considerable realignment of the ingredients in relation to each other, i.e. further mixing.

(II) The action of rotating the sloping tray brings about a rotary movement of the delivery tip of this tray and the result is that a string of sugar (flavoured and acidified) is deposited on the band in a form which could be identified as the projection of a coil spring. By this means further mixing occurs because the relative speeds of rotation of the tray and forward travel of the conveyor are such that before a given point on the conveyor leaves the receiving zone it has received several layers of sugar. The rotating tray serves as a spreading device, and its length and radius of action are suited to the width of the ribbon of sugar required on the conveyor band.

As the sugar travels down the spout, it forms into a hollow tube with the additives coating the inside wall of the tube so that the additives are imprisoned in the sugar. The walls of this hollow tube of sugar come together when the tube meets the sloping tray and this causes further mixing of the additives with the sugar in a natural manner and without violent agitation such as would cause the sugar to grain, i.e. to revert from a clear to a crystalline condition.

The flavouring is preferably pumped continuously into the funnel through a fine hollow needle. It does not volatilize due to the fact that the sugar in the funnel has been reduced to a temperature of the order of 270° F. and the flavour entering the funnel is almost immediately covered by a succeeding layer of sugar.

We thus introduce the acid and flavouring to the sugar under conditions identical with those existing at the start of each present batch manufacturing operation with their feeds so arranged that they are continuous.

To safeguard against blockage, we may provide a number of valve controlled needles, fed from a common manifold, for supplying flavouring to the funnel.

As an alternative to discharging the sugar from the funnel to a conveyor band, the sugar may be delivered to a depositor which discharges the sugar into moulds. In this case the path of travel of the sugar from the funnel to the depositor should be as short as possible in order to reduce to a minimum the cooling and the inversion of the sugar.

The sugar discharged from the funnel may also be used to coat cereals, e.g. those used for breakfast food, or other material which it may be desired to coat with acidified and flavoured sugar. In this case the sugar may be discharged either directly from the rotating tray or by means of an intervening chute into a rotary drum containing the cereal or into a mixing trough containing the cereal and also a suitable agitator or stirrer.

Certain embodiments of the invention will now be described in more detail by way of example, with reference to the accompanying drawings, in which:

FIG. 1 is a diagrammatic side elevation, partly in section, of one form of apparatus according to the invention.

FIG. 2 is a corresponding plan view,

FIG. 4 shows an alternative form of dispenser,

Like reference numerals indicate like parts throughout the figures.

Figure 3:
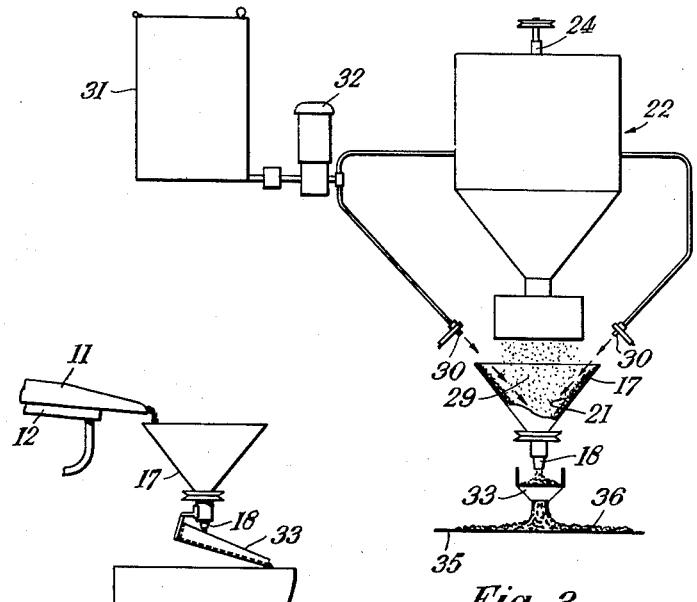
FIG. 3 is a section on the line III—III in FIG. 2.

As shown in FIG. 1, cooked sugar is discharged from a Microfilm cooker 10, of the kind described in British Patent No. 405,276, to a cooling chute 11, provided with a steam jacket 12, to which steam is supplied through a pipe 13 provided with a regulating valve 14 and a pressure gauge 15. The ribbon 16 of sugar flowing down the chute 11 flows into the upper end of a funnel 17, having at its lower end a spout 18. The funnel 17 is continuously rotated by an electric motor 19 through a belt drive 20. The sugar travels down the inner surface of the funnel 17 as indicated at 21. This section 21 of sugar receives a uniform coating of powdered acid from a dispenser 22 located above the funnel. The dispenser has a sieve 23 at the bottom and contains a shaft 24 also rotated by the motor 19 through a belt drive. The shaft 24 carries a scraper 25, a stirrer 26, a feed worm 27 and brushes 28 which agitate the powder and cause a uniform shower 29 of powder (FIG. 3) to be delivered into the upper end of the funnel 17. Liquid flavouring (which may contain a colouring agent) is squirted into the funnel 17 through nozzles 30, the flavouring being delivered to the nozzles 30, constituted by fine hollow needles, from a tank 31 by a metering pump 32.

The sugar and additives are discharged from the spout 18 of the funnel 17 on to a downwardly sloping tray 33 fixed to and rotating with the funnel. The tray deposits the sugar in coiled formation, as indicated at 34 in FIG. 2, on a water cooled steel conveyor band 35, forming on the band a laminated ribbon 36. The band 34 may be cooled by a thermostatically controlled water spray, not shown.

The steel band 35 presents the sugar, after it has cooled sufficiently, into contact with two water jacketed ploughs 37, 38 which extend obliquely and in succession across the steel band. These ploughs 37, 38 are so arranged that their lower edges are sprung into contact with the band 35. In this way the whole ribbon 36 is lifted from the conveyor and rolled into a plastic coil (or Swiss roll). The ploughs 37, 38 are so arranged that they cause the whole width of the ribbon 36 to lift from the band 35. As the result, the ribbon 36 becomes a strand 39.

Soon after leaving the ploughs, the strand 39 is introduced into a nip between the steel band 35 underneath and a water jacketed roll 40 above it. The roll 40 is rotated at a speed such that its surface speed is identical with that of the steel band 35. After passing through the nip the sugar is again in the form of a ribbon 41 and is at a satisfactory temperature and viscosity to be removed from the band 35 for further and more conventional processing.

Thus the ribbon 41 may be ploughed off the band 34 and fed continuously to a former, e.g. of the kind described in British Patent No. 784,157, and thence to a machine for moulding it into tablets.

A modified form of dispenser is shown in FIG. 4, in which the parts bear the same reference numerals as corresponding parts in FIG. 1 with the addition of the subscript A. In this case the feed worm 27A is shorter, a scraper 25A of different configuration is utilized and the dispenser is provided with an air heated jacket 50 to ensure that the powdered acid does not become damp.

If desired, the mouth of the dispenser 22 may be situated below the level of the upper end of the funnel 17 as a safeguard against exposure of the emerging powdered acid to air currents during its descent into the funnel. In a typical example of production of high boiled sugar confectionery utilizing the apparatus shown in FIG. 1, the output of sugar is 500 lbs. per hour, the speed of travel of the band 35 is 7 ft. per minute, the speed of rotation of the funnel 17 is 30 r.p.m., the rate of addition of powdered acid to the sugar is $\frac{1}{16}$ oz. per minute and the rate of addition of flavouring is ½ fluid oz. per minute.

Figure 5:
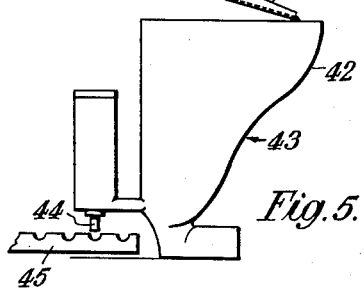
FIG. 5 shows a modified construction in which the sugar is discharged into a depositor and FIG. 6 shows a further modification in which the sugar is discharged into a mixer.

In the arrangement shown in FIG. 5 the sugar from the sloping tray 33 attached to the rotary funnel 17 is discharged into a hopper 42 forming part of a depositor 43. The depositor is gravity fed with plastic sugar from the tray 33 and contains plungers which reciprocate vertically in timed relationship with a horizontally moving cut off bar. These parts being well known are not illustrated. Sugar is drawn into the cylinders containing the plungers on the up stroke of the plungers and the cut off bar then moves to cut off the cylinders from the hopper 42 and place the cylinders in communication with nozzles 44. The plungers then move closer to eject sugar through the nozzles 44 into a mould 45.

Figure 6:
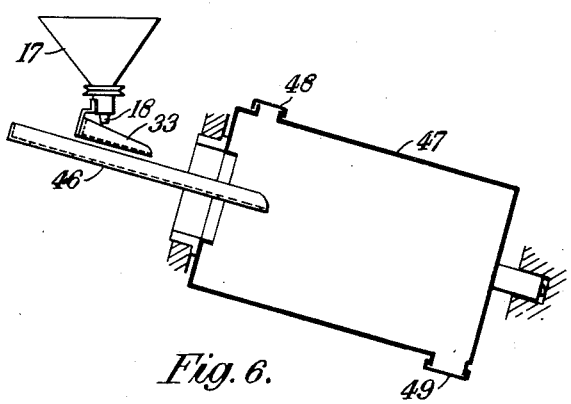

In the arrangement shown in FIG. 6, the sugar is discharged via a short chute 46 into an inclined rotating cylinder 47 having an inlet 48 for cereal and an outlet 49 for the sugar-coated cereal. The chute 46 allows air which may be trapped in the sugar to escape before the sugar enters the cylinder 47.

What we claim as our invention and desire to secure by Letters Patent is:

1. Apparatus for manufacturing sugar confectionery comprising a downwardly tapering funnel, means for rotating the funnel about its axis, means for feeding a ribbon of hot cooked sugar into the upper end of the funnel and into contact with the inner surface thereof, and means for discharging additives on to the sugar on the inner surface of the funnel, whereby the sugar emerges from the lower end of the funnel as a hollow tube with the additives imprisoned in the sugar.

2. Apparatus for manufacturing sugar confectionery comprising a downwardly tapering funnel, means for rotating the funnel about its axis, means for feeding a ribbon of hot cooked sugar into the upper end of the funnel and into contact with the inner surface thereof, means for discharging additives on to the sugar on the inner surface of the funnel and a downwardly sloping tray, fixed to the lower end of the funnel so that it rotates therewith, for receiving the sugar and additives emerging from the lower end of the funnel.

3. Apparatus according to claim 2, in which the additive discharging means includes a dispenser situated above the funnel for dispensing into the funnel a shower of powder distributed substantially uniformly over the area of its upper end.

4. Apparatus according to claim 3, in which said dispenser includes a sieve positioned above the funnel and an agitating brush disposed above the sieve for agitating powdered acid resting thereon.

5. Apparatus according to claim 3, in which the additive discharging means further includes a device for injecting liquid flavoring into the funnel.

6. Apparatus for manufacturing sugar confectionery comprising a downwardly tapering funnel, means for rotating the funnel about its axis, a continuous cooker, means for continuously delivering from said cooker a ribbon of hot cooked sugar into the upper end of the funnel and into contact with the inner surface thereof, and means for discharging additives on to the sugar on the inner surface of the funnel, whereby the sugar emerges from the lower end of the funnel as a hollow tube with the additives imprisoned in the sugar.

7. Apparatus according to claim 2, which further includes a conveyor band beneath the tray for continuously receiving the sugar and additives emerging from the tray.

8. Apparatus according to claim 7, which further includes ploughs for folding the sugar admixed with additives on the conveyor into a strand and a roll which co-acts with the conveyor to reform the strand of sugar into a ribbon.

References Cited in the file of this patent

UNITED STATES PATENTS

| | | |
|---|---|---|
| 1,609,685 | Dellenbarger | Dec. 7, 1926 |
| 2,579,696 | Perlman | Dec. 25, 1951 |